H. E. HOLLISTER.
METHOD OF AND APPARATUS FOR DRYING MATERIALS.
APPLICATION FILED JULY 17, 1917.
1,301,130.
Patented Apr. 22, 1919.
2 SHEETS—SHEET 2.
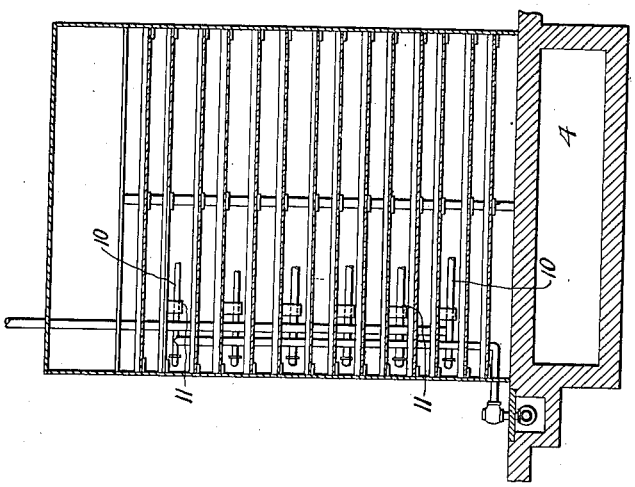
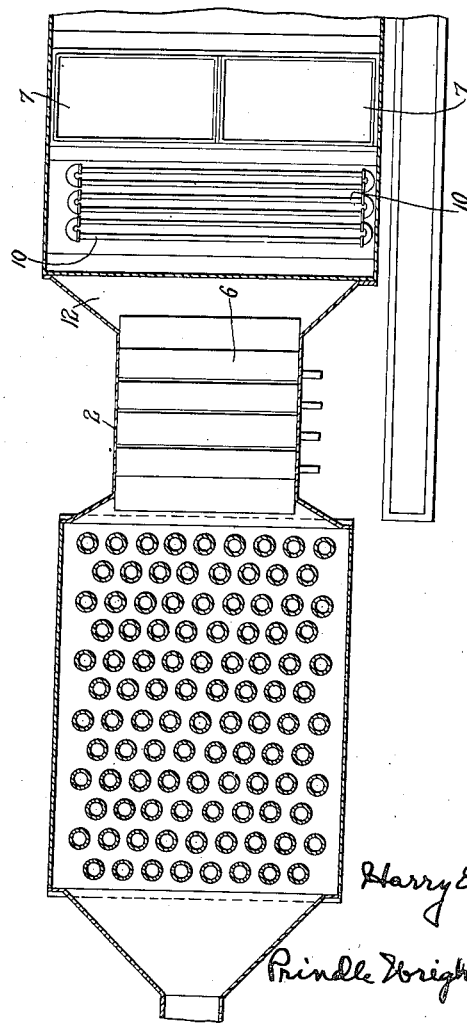
INVENTOR
Harry E. Hollister,
BY
Prindle Wright & Small,
ATTORNEYS.

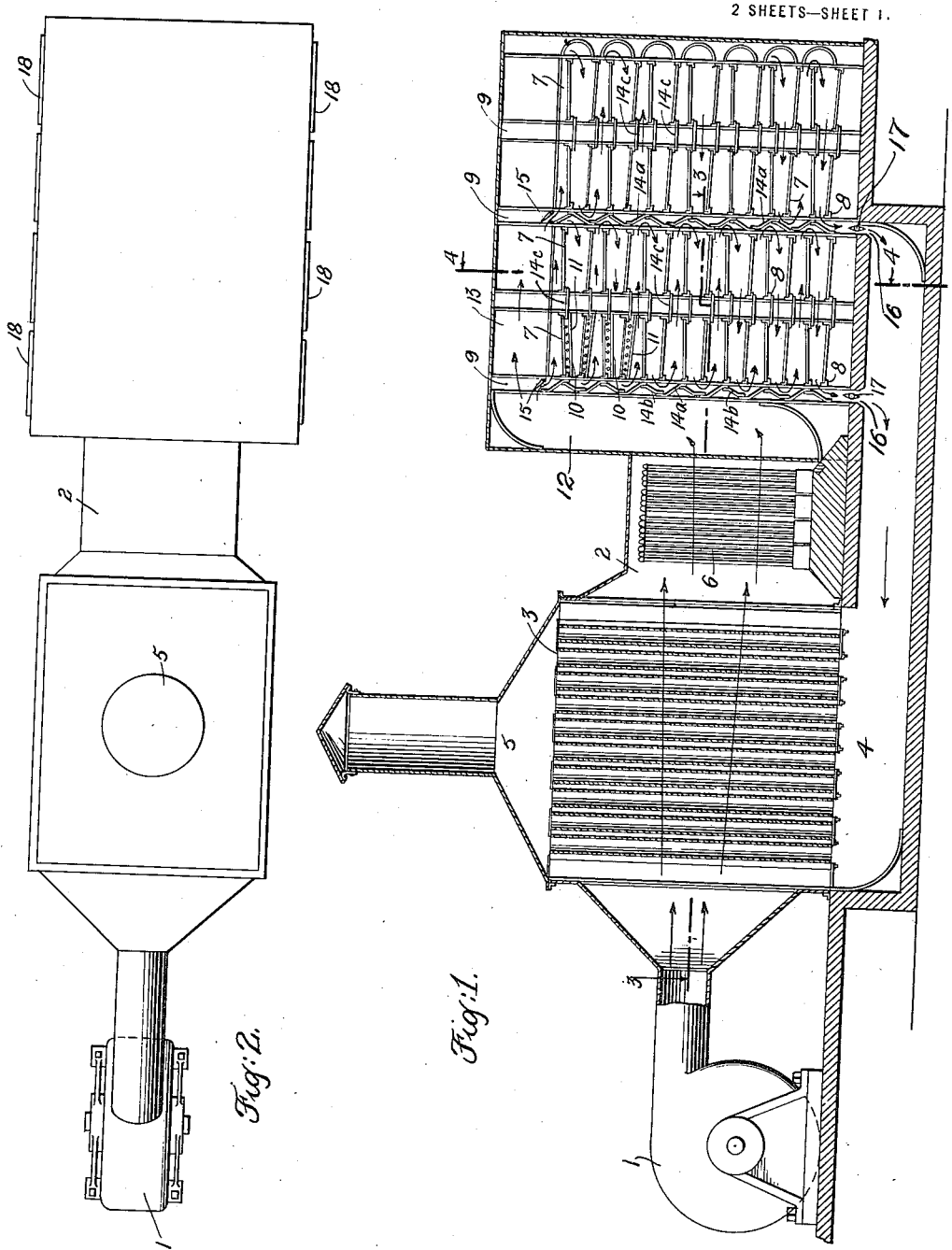

UNITED STATES PATENT OFFICE.

HARRY E. HOLLISTER, OF IRVINGTON, NEW JERSEY, ASSIGNOR TO KALBPERRY CORPORATION, OF ELIZABETH, NEW JERSEY, A CORPORATION OF NEW JERSEY.

METHOD OF AND APPARATUS FOR DRYING MATERIALS.

1,301,130.     Specification of Letters Patent.      Patented Apr. 22, 1919.

Application filed July 17, 1917. Serial No. 180,983.

*To all whom it may concern:*

Be it known that I, HARRY E. HOLLISTER, of Irvington, in the county of Essex and in the State of New Jersey, have invented a certain new and useful Improvement in Methods of and Apparatus for Drying Materials, and do hereby declare that the following is a full, clear, and exact description thereof.

The object of my invention has been to provide a method of and apparatus for drying materials which shall have the advantage of increased efficiency, in that it shall be capable of drying material in a shorter time and with less expenditure of fuel, and to such ends my invention consists in the method of and apparatus for drying materials hereinafter specified.

In the accompanying drawings I have illustrated an embodiment of my invention which I regard as one of the best embodiments known to me, but my invention is capable of embodiment in many different forms, and the illustrated embodiment is therefore to be regarded only as typical of the invention, and my invention is not to be confined thereto.

In the drawings—

Figure 1 is a vertical, longitudinal, sectional view of a drier embodying my invention, the view being more or less diagrammatic;

Fig. 2 is a plan view of Fig. 1;

Fig. 3 is a horizontal, sectional view of Fig. 1 on the line 3—3; and,

Fig. 4 is a vertical, sectional view of Fig. 1 on the line 4—4.

In the illustrated embodiment I have provided a means 1 (which, in the present instance, is illustrated as a fan) for introducing air into a housing 2 that is adapted to contain the material to be dried. The air then passes through a preheater, or economizer, 3 which, in the present instance, is shown as being provided with vertical pipes around the outside of which the air is forced by the fan. These pipes are open at the bottom into an air duct 4, conveying the air away from the material which is being dried, and at the top into an exhaust stack 5 conveying the air which has been utilized to the atmosphere. By this means the heat contained in the exhaust air is transferred to the fresh air driven in by the fan, and is largely saved from passing out through the stack.

After passing through the preheater, or economizer, the air passes through a heater 6 which, in the present instance, is in the form of coils of pipe through which steam passes, and around and outside of which the air passes that is driven by the fan. The air next passes to the material to be dried. This material, in the present instance, is held in trays 7 which are mounted on slides or ways that, in the present instance, are shown as angle-irons 8, secured horizontally to uprights 9 in the casing. Beneath each tray is a heater which, in the present instance, is in the form of a coil 10, and that is illustrated as supported by a pipe hanger 11. The air from the heater 6 enters a vertical passage 12 which, at its top, turns into a horizontal passage 13 extending entirely along the heater. The space between adjacent stacks of trays is divided vertically by zig-zag partitions consisting of plates 14$^a$ inclined toward a shelf support at its lower end, and a plate 14$^b$ touching said shelf support at its upper end and inclined away from it in a downward direction to meet the next plate 14$^a$. Each two stacks of trays forms a unit, and plates 14$^c$ close the space between each two trays of a unit that are on the same level. The zig-zag partitions are so arranged that upon opening a damper 15 controlling the admission of air from the duct 13, air passes beneath the said damper and over the first two trays toward the right, and then passes around their ends and over the next two trays toward the left, and so on, zig-zag, downward until the air passes out through an opening 16 (controlled by a damper 17) into the passage 4 leading to the preheater. The trays are preferably inclined slightly in an upward direction, considered in the direction of flow of the air. The dampers enable the air to be admitted to or shut off from any particular stack, according as such stack is being used or not. In order to permit trays being put in and taken out, doors 18 are provided, preferably on both sides of the casing.

In the practice of my method by the apparatus which I have described, the air is drawn in by the fan and forced through the economizer and there receives the heat from the exhaust air as it passes around the tubes 3, thus saving a large proportion of the heat in the exhaust air which would otherwise be lost. After this preliminary heating, the air passes through the heater 6 and receives a further increase in heat. The air then passes through the openings controlled by the dampers 15 and over the first or uppermost pair of trays. The material in these trays has been heated by the heaters beneath them, preferably to the highest temperature that would not injure the material, and this, together with the high moisture carrying capacity, due to the high temperature of the air, results in a comparatively very rapid drying of the material. Because of the upward inclination of the trays in the direction of flow of the air, the air is caused to penetrate the material to a greater extent than it would if the trays were horizontal. The air then passes beneath the first pair of trays and over the second pair of trays.

Practical experience has shown that my heater is very efficient, and that both the time required for drying and the amount of fuel utilized in drying is largely reduced.

Prior to my invention, so far as known to me, in driers in which the material is treated by a current of air, the heating of the material, to whatever extent such heating has occurred, has been due to heat communicated to it by the air which has carried off the moisture. I separate these two functions and heat the material independently of the air to the highest temperature which the material will stand. The air is heated to the temperature which is best suited to the material being dried, so that the air and material are both at their most efficient temperatures at the last trays treated by the air, as well as at the first trays. The air is merely depended upon as a carrier for the moisture, and not at all for raising the temperature of the material being dried. Due to the fact that the air is only used as a carrying medium for the moisture, and the heat for driving off the moisture is furnished by separate means, there is no change in the moisture carrying capacity of the air, and therefore no precipitation of moisture from the air. This has peculiar advantage in the drying of certain delicate materials such as certain colors and pigments whose shades would be changed by the precipitation of moisture. While I obtain the very efficient drying due to these conditions, I avoid the loss of fuel which would be caused by permitting the air to escape from the last tray, with its large amount of heat, directly into the atmosphere, by causing it to pass through the preheater and communicate its heat to the incoming air. This mode of operation enables me to secure a drying of the material at much higher temperatures than are possible in the prior art, so far as known to me, and this without injury to the material.

I claim:

1. The process of drying materials, comprising heating the materials to cause evaporation thereof and passing air over the materials at such a temperature that it will act only to extract moisture given off by evaporation, the evaporating operation being carried on independently of the air currents.

2. The process of drying materials, comprising heating the materials to cause evaporation thereof and passing air over the materials independently heated to a temperature to cause it to absorb the moisture of evaporation without substantial change in temperature of the air during the moisture absorbing operation.

3. The process of drying materials, consisting in heating air, passing it over successive portions of the material to be dried, evaporating the material independently of the heat of the air, and transferring heat from the exhaust air to incoming new air.

4. The process of drying materials, consisting in heating air, passing it over the material to be dried, evaporating said material independently of the heat of the air, transferring heat from the exhaust new air to incoming air, and causing said air to impinge upon the surface of the material to be dried.

5. The process of drying materials, consisting in heating air, passing it over successive portions of the material to be dried, evaporating the material independently of the heat of the air, transferring heat from exhaust new air to the incoming air, and causing said air to impinge upon the surface of the material to be dried.

6. The process of drying materials, consisting in heating air, passing it over the material to be dried, evaporating said material independently of the heat of the air, and transferring heat from the exhaust air to incoming new air, and causing said air to impinge upon the surface of the material to be dried by inclining the surface of the material to the direction of transfer of the air.

7 A drier, consisting of a preheater, a heater, means for supporting the material to be dried, means for heating said support, and means for conveying air through said preheater and through said heater and over the material to be dried, and for conveying the exhaust air through said preheater.

8. A drier, consisting of a heater, a series of devices for holding material to be dried, means for heating each of said devices, and means for conveying a continuous current of air through said heater and successively over said devices.

9. A drier, consisting of a preheater, a heater, a series of devices for holding material to be dried, means for heating each of said devices, and means for conveying air through said preheater, through said heater, and successively over said devices, and means for conveying the exhaust air through said preheater.

10. A drier, consisting of a preheater, a heater, a series of devices for holding material to be dried, means for heating each of said devices, means for conveying air through said preheater, through said heater, and successively over said devices, means for conveying the exhaust air through said preheater, and means for causing the air to travel in a path inclined to the surface of the material.

11. The combination of a heater, a series of devices for holding material to be dried, means for causing a continuous current of air to pass through said heater and successively in contact with the materials held by said series of devices, and means for heating each of said devices.

12. The combination of a preheater, a heater, a series of devices for holding material to be dried, means for causing air to pass through said preheater, through said heater, and successively in contact with the materials held by said series of devices, means for heating each of said devices, and means for conveying the exhaust air through the preheater.

13. The combination of a heater, a vertical series of devices for holding material to be dried, means for heating each of said devices independently of the air, and means for causing the air to pass through said heater and successively in contact with the materials held by said devices, progressively in a downward direction.

14. The combination of a preheater, a heater, a vertical series of devices for holding material to be dried, means for heating each of said devices independently of the air, means for causing the air to pass through said heater and successively in contact with the materials held by said devices, progressively in a downward direction, and means for conveying the exhaust air through the preheater.

15. The process of drying materials, consisting in heating material and passing air over such material, evaporating said material independently of the air, said air being heated to such a temperature that it is always above the dew point while the air is in contact with the material.

16. The process of drying materials, comprising separating the materials into layers, independently heating each layer to cause evaporation thereof and passing air over the layers at a temperature at which the moisture of evaporation will be absorbed by the air without substantial change in temperature of the air during the moisture absorbing operation.

17. The combination of a heater, a series of evaporating trays arranged in a stack, an air passage over each tray, the air passages over adjacent trays being connected to form a continuous passage, and means for forcing air through said heater and through said continuous passage.

18. The combination of a heater, a series of evaporating trays arranged in a stack, an air passage over each tray, the air passages over adjacent trays being connected to form a continuous passage, and means for forcing air under pressure through said heater and introducing said air into said continuous passage at the top of said stack of trays.

19. The combination of a heater, a series of evaporating trays arranged in a stack, and adjacent trays being inclined in opposite directions, an air passage over each tray, the air passages over adjacent trays being connected to form a continuous passage, and means for forcing air through said heater and continuous air passage.

In testimony that I claim the foregoing I have hereunto set my hand.

HARRY E. HOLLISTER.

Witnesses:
  H. S. THOMPSON,
  PAUL W. WEBSTER.